(12) United States Patent
Snyder et al.

(10) Patent No.: US 7,835,514 B1
(45) Date of Patent: Nov. 16, 2010

(54) PROVIDE A GRACEFUL TRANSFER OUT OF ACTIVE WAIT TREATMENT

(75) Inventors: Robert Snyder, Danville, CA (US); Robin D. Taylor, Danville, CA (US)

(73) Assignee: Avaya Inc., Basking Ridge, NJ (US)

( * ) Notice: Subject to any disclaimer, the term of this patent is extended or adjusted under 35 U.S.C. 154(b) by 1094 days.

(21) Appl. No.: 11/523,402

(22) Filed: Sep. 18, 2006

(51) Int. Cl.
H04M 3/00 (2006.01)
(52) U.S. Cl. .................. 379/266.01; 379/266.06
(58) Field of Classification Search ............ 379/266.01, 379/266.06
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A * | 4/1993 | Kohler et al. ......... 379/265.12 |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,469,503 A | 11/1995 | Butensky et al. |
| 5,469,504 A | 11/1995 | Blaha |

(Continued)

FOREIGN PATENT DOCUMENTS

CA 2143198 1/1995

(Continued)

OTHER PUBLICATIONS

Wireless Client/Server Computing for Personal Information Services and Applications, author: Elmagarmid et al, ACM, 1995.* .

(Continued)

Primary Examiner—Creighton Smith
(74) Attorney, Agent, or Firm—Sheridan Ross P.C.

(57) ABSTRACT

The present invention provides a graceful transfer of a contact from a queue to another party. More particularly, exit points are defined within a given wait treatment for the contact. While the contact is in queue waiting for service the initiator of the contact is able provided with the wait treatment. When the contact is ready to be removed from the queue (e.g., because a servicing agent is ready to available to service the contact), the contact is kept in the queue and continues to be provided the wait treatment until an exit point has been reached.

22 Claims, 4 Drawing Sheets

U.S. PATENT DOCUMENTS

| | | | |
|---|---|---|---|
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Constantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,684,872 A * | 11/1997 | Flockhart et al. | 379/266.08 |
| 5,684,874 A | 11/1997 | Yagyu et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,740,238 A | 4/1998 | Flockhart et al. | |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | |
| 5,838,968 A | 11/1998 | Culbert | |
| 5,839,117 A | 11/1998 | Cameron et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,084,954 A | 7/2000 | Harless | |
| 6,088,441 A | 7/2000 | Flockhart et al. | |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,471 B1 | 5/2001 | Schlueter et al. | |
| 6,256,773 B1 | 7/2001 | Bowman-Amuah | |
| 6,259,969 B1 | 7/2001 | Tackett et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | |
| 6,353,810 B1 | 3/2002 | Pertrushin | |
| 6,356,632 B1 | 3/2002 | Foster et al. | |
| 6,366,668 B1 | 4/2002 | Borst et al. | |
| 6,389,028 B1 | 5/2002 | Bondarenko et al. | |
| 6,389,132 B1 | 5/2002 | Price | |
| 6,389,400 B1 | 5/2002 | Bushey et al. | |
| 6,424,709 B1 | 7/2002 | Doyle et al. | |
| 6,425,125 B1 | 7/2002 | Fries et al. | |
| 6,426,950 B1 | 7/2002 | Mistry | |
| 6,427,137 B2 | 7/2002 | Pertrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,496,977 B1 | 12/2002 | Hamilton et al. | |
| 6,523,166 B1 | 2/2003 | Mishra et al. | |
| 6,535,600 B1 | 3/2003 | Fisher et al. | |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,597,685 B2 | 7/2003 | Miloslavsky et al. | |
| 6,614,903 B1 | 9/2003 | Flockhart et al. | |
| 6,650,748 B1 | 11/2003 | Edwards et al. | |
| 6,675,204 B2 | 1/2004 | De Boor et al. | |
| 6,697,457 B2 | 2/2004 | Petrushin | |
| 6,704,409 B1 | 3/2004 | Dilip et al. | |

| | | | |
|---|---|---|---|
| 6,707,903 | B2 | 3/2004 | Burok et al. |
| 6,754,333 | B1 | 6/2004 | Flockhart et al. |
| 6,766,013 | B2 | 7/2004 | Flockhart et al. |
| 6,766,014 | B2 | 7/2004 | Flockhart et al. |
| 6,820,260 | B1 | 11/2004 | Flockhart et al. |
| 6,947,543 | B2 | 9/2005 | Alvarado et al. |
| 7,035,927 | B2 | 4/2006 | Flockhart et al. |
| 7,170,991 | B2* | 1/2007 | Shaffer et al. .......... 379/265.02 |
| 2002/0194002 | A1 | 12/2002 | Pertrushin |
| 2003/0174830 | A1 | 9/2003 | Boyer et al. |
| 2003/0177017 | A1 | 9/2003 | Boyer et al. |
| 2004/0203878 | A1 | 10/2004 | Thomson |
| 2006/0239442 | A1* | 10/2006 | Shaffer et al. .......... 379/266.01 |
| 2007/0291922 | A1* | 12/2007 | Matteo et al. .......... 379/265.01 |
| 2008/0037723 | A1* | 2/2008 | Milstein et al. .......... 379/88.12 |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

E. Margulies, IVR Meets the Internet, IVR Supplement, 1996, pp. 41-47.

Netspeak's Hot Internet Sun Product, Computer Telephony, Aug. 1996, vol. 5, Issue 8, pp. 120, 122-124.

Internet Hop Off, Computer Telephony, Mar. 1996, vol. 4, Issue 3, pp. 10, 12.

E. Margulies, Vocaltec's Telephony Gateway—The Ultimate Internet Telephor Solution?, Computer Telephony, Sep. 1996, vol. 4, Iss. 9, pp. 30, 32, 34-35.

Z. Grigonis, Rockwell Teams with Dialogic to Build Groupware Servers for Small Centers, Computer Telephony, Apr. 1996, vol. 4, Iss. 4, p. 112.

P. Roberts, Dialogic and Vocaltec Open a Door to a World of Possibility, Computer Telephony, Apr. 1996, vol. 4, Iss. 4, p. 4.

R. Grigonis, Altigen's Mixed-Media Server Platform—Re-shapes Zippy's CT Vision, Computer Telephony, Apr. 1996, vol. 4, Iss. 4., p. 49.

Z. Grigonis, Genesys Labs' and Tandem Team for Red Hot Call-Center Solutions, Computer Telephony, Apr. 1996, vol. 4, Iss. 4., pp. 98-99.

Microlog's Unique All-In-One Unique Agent, Computer Telephony, Nov. 1998, vol. 6, Issue 11, pp. 41-42.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Avaya, Inc. Business Advocate Options, at http://www.avaya.com, downloaded on Feb. 15, 2003, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality In IP Voice Networks," Avaya, Inc., 2002, pp. 1-17.

Dawson, "NPRI's Powerguide, Software Overview" Call Center Magazine (Jun. 1993), p. 85.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Foster, Robin, et al., "Avaya Business Advocate and its Relationship to Multi-Site Load Balancing Applications," Avaya, Inc., Mar. 2002, 14 pages.

GEOTEL Communications Corporation Web site printout entitled "Intelligent CallRouter" Optimizing the Interaction Between Customers and Answering Resources., 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26,2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"eGain's Commerce 2000 Platform Sets New Standard for eCommerce Customer Communications," Business Wire (Nov. 15, 1999)., 3 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

"When Talk Isn't Cheap," Sm@rt Reseller, v. 3, n. 13 (Apr. 3, 2000), p. 50.

* cited by examiner

PROVIDE A GRACEFUL TRANSFER OUT OF ACTIVE WAIT TREATMENT

FIELD OF THE INVENTION

The present invention is directed generally to telephony systems and specifically to managing contact queues.

BACKGROUND OF THE INVENTION

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day Automatic Call Distribution (ACD) systems when the ACD system's controller detects that an agent has become available to handle a contact, the controller identifies all predefined contact-handling queues for the agent (usually in some order of priority) and delivers to the agent the highest-priority oldest contact that matches the agent's highest-priority queue. Generally, the only condition that results in a contact not being delivered to an available agent is that there are no contacts waiting to be handled.

When the contact is in the form of a call, often enqueued callers are placed on hold and ACD resources are used to play announcements or other audio programs (e.g., songs, commercials, etc.) to the callers while the caller waits. The audio programs are commonly referred to as "music-on-hold." These types of wait treatments are limited in that the callers' in-queue experience is limited and the potential for the caller becoming bored and hanging up increases as the caller continues to wait.

During high contact center volume times there is an increase in the number of lost contacts due to extensive wait times. This is because the contactor tends to get bored with the generic "music-on-hold" types of wait treatments. There is a potential to turn this wait time into a productive time for both the customer and the contact center. For example, in U.S. Pat. No. 6,820,260 to Flockhart et al., the entire contents of which are hereby incorporated herein by this reference, a customized applet is provided that can be downloaded by a customer's communication device or terminal. The applet can be customized based on known customer information and customer location. When a contact is put on hold an applet is provided to the customer for execution by the customer's terminal. When the terminal's communication is taken off hold (e.g., when an agent becomes available), the execution of the applet stops and the agent begins servicing the contact.

Although some solutions have been provided to customize wait treatments for customers on hold, many of these solutions abruptly take the customer out of waiting when an agent is available. This action is based on the assumption that the customer wants to be on hold for the smallest amount of time possible. However, the abrupt interruption of a customer during wait treatment may give some customers the perception that they are being passed between an agent and hold in a haphazard manner. If the wait treatment corresponded to some type of advertisement or even survey it would be imprudent to interrupt the customer during such a wait treatment. However, since it is assumed that the customer does not want to be on hold, the customer is typically not allowed to finish a portion of the wait treatment which may result in the customer becoming annoyed or the contact center foregoing valuable customer feedback.

SUMMARY

These and other needs are addressed by various embodiments and configurations of the present invention. The present invention is directed generally to a contact management during wait treatment. More specifically, a graceful transfer out of active wait treatment is provided herein.

In accordance with one embodiment of the present invention, a method of handling one or more contacts in a contact queue is provided. The method generally comprises the steps of:

(a) receiving a contact in a contact queue;
(b) assigning an agent to the contact;
(c) after assigning the agent to the contact one of:
   (i) waiting for a predetermined time to commence connecting the agent to the contact;
   (ii) waiting until after a predetermined time to commence connecting the agent to the contact; and
(d) after waiting, connecting the agent to the contact.

As can be appreciated by one skilled in the art, a "contact" is understood herein to include voice calls, chats, video calls, and combinations thereof. Embodiments of the present invention are particularly well suited for use with any type of known real-time or interactive contacts such as those listed above.

While a contact is in a contact queue often a contact will be provided with some sort of wait treatment. One embodiment of the present invention is to create and automatically provide the customer with a meaningful wait treatment that gives the customer a sense of appreciation and usefulness even though they are on hold. Wait treatments may be chosen for a particular contact depending upon the type of contact and/or a state of the queue. The wait treatment may be provided in accordance with the automated service logic.

The wait treatment, in accordance with embodiments of the present invention, includes one or more predetermined exit points that help increase the enjoyment of interacting with the wait treatment. Since the contact is not connected to an available agent until the assigned wait treatment has reached one of the exit points, the agent does not interrupt the wait treatment. Interrupting a wait treatment may seem somewhat rude, especially when useful information is being provided to and/or received from the customer. In these situations an abrupt transition from a wait treatment to connection with a contact center agent can be avoided by waiting until a graceful transfer time indicated by the exit point.

The use of exit points for contacts in a contact center can also be advantageous to agents of the contact center. In one embodiment, while an agent is assigned to a contact but before the agent is connected to the contact (i.e., the agent is waiting for the wait treatment to reach an exit point), the agent may be provided with information pertinent to the customer of the assigned contact. The agent can review the customer information while the customer is finishing up with the wait treatment. In other embodiments, the assigned agent can begin servicing the contact prior to being connected to the contact. Thus when the customer is finally connected with the agent, the agent will have more knowledge about the customer and will be able to provide the customer with more personalized and efficient customer service.

A contact may be received in a contact queue from a number of different locations. Often times contacts are initially received in a contact center or similar contact receiving architecture where they are initially placed in a contact queue until an agent becomes available to service the contact. In other examples, a servicing agent can transfer the contact to a different agent, which may also place the contact in a contact queue until the different agent becomes available. When an agent is transferring the contact to another agent, the contact can be considered resident in a queue during the interim. In still other embodiments, an agent may place a contact on hold. During such a wait time, the customer associated with the contact may be provided with a wait treatment in accordance with embodiments of the present invention. When the agent is ready to take the contact back off of hold, the agent may have to wait until the wait treatment reaches a predetermined time typically corresponding to a predefined exit point in the wait treatment.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using server(s), the invention is not limited to use with any particular type of communication system or configuration of system elements. Those skilled in the art will recognize that the disclosed techniques may be used in any communication application in which it is desirable to provide a graceful transfer out of active wait treatment.

Figure 1:
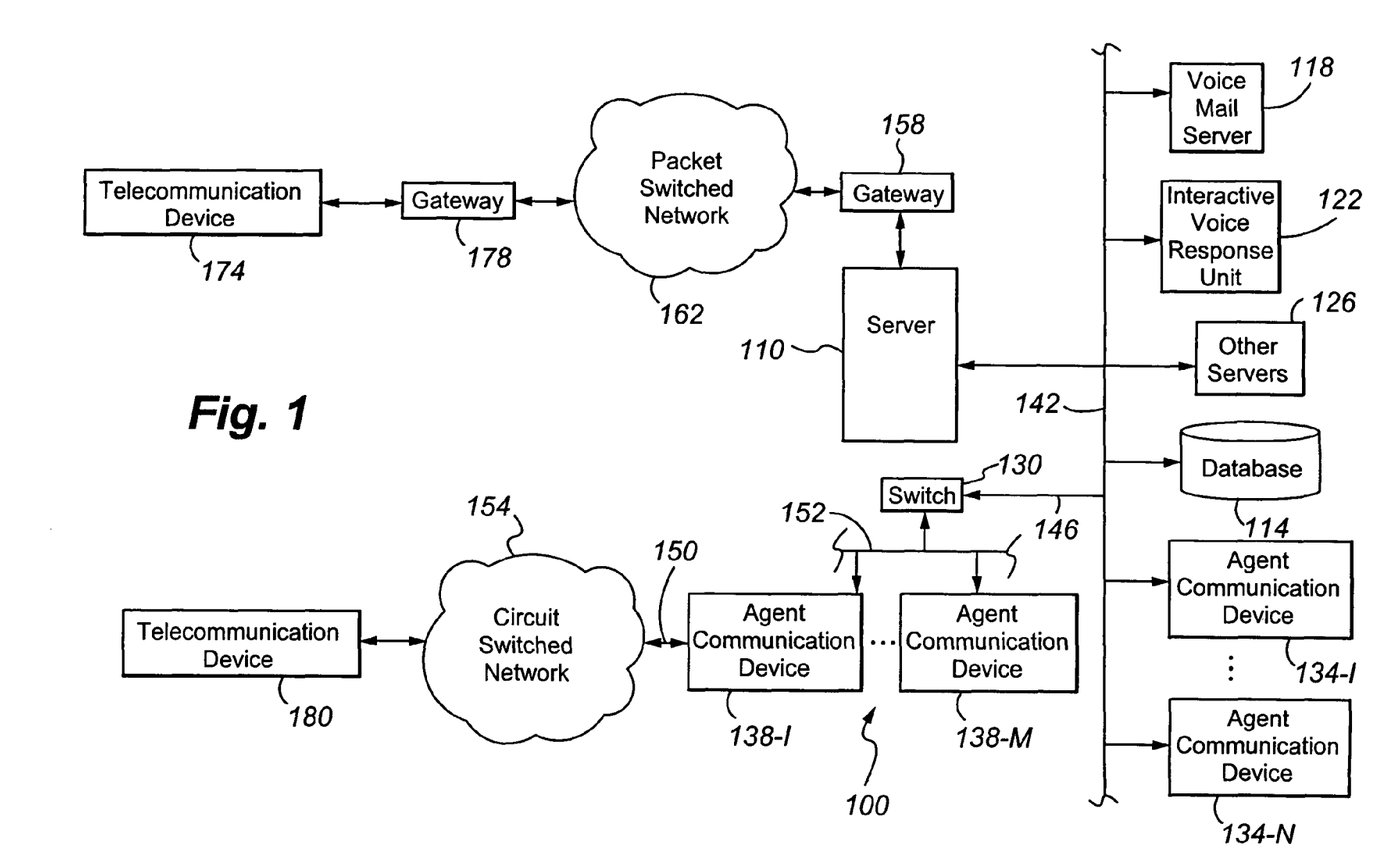
FIG. 1 is a block diagram depicting a communication system in accordance with embodiments of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
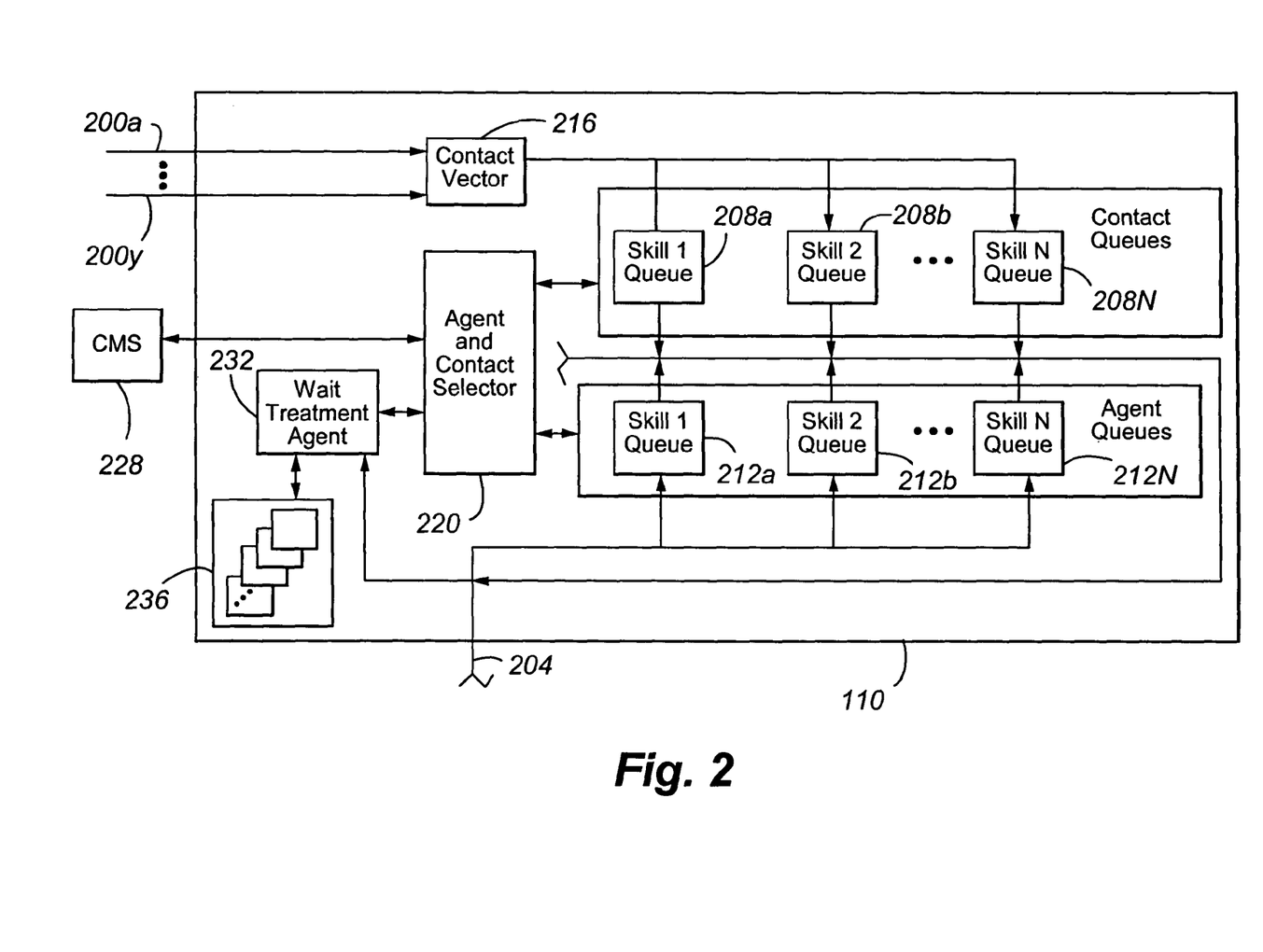
FIG. 2 is a block diagram depicting a server in accordance with embodiments of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports. CMS 228 and any other reporting system, such as a Basic Call Management System™, and an Operational Analyst™ will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's queues are prioritized according to his or her level of expertise in that queue, and either agents are enqueued in individual ones of agent queues 212a-n in their order of expertise level or are enqueued in different ones of a plurality of agent queues 212a-n that correspond to a queue and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer level (e.g., platinum, gold, silver), customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices 138 can include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

Reverting back to FIG. 2, according to at least one embodiment of the present invention, a wait treatment agent 232 is provided along with the server 110. The wait treatment agent 232 is an automated service logic that is capable of providing wait treatments to contacts in the contact queues 208. The wait treatment agent 232 is in communication with the agent and contact selector 220 and thus is able to estimate the amount of wait time a particular contact will endure while in the contact queue 208. Based on the estimated wait time the wait treatment agent 232 can choose a suitable wait treatment from a wait treatment data store 236 for the contact that is suited to the approximate wait time. For example, if the wait treatment agent 232 estimates the wait time for a contact to be around seven minutes, then the wait treatment agent 232 will likely assign a wait treatment to the contact that has a duration around seven minutes. In accordance with at least one embodiment of the present invention, wait treatments may be equipped with predefined exit points that control the release of a contact from the contact queue 208. The wait treatment agent 232 may be operable to choose a wait treatment for a contact based on the location of those exit points rather than the total duration of the wait treatment.

The wait treatment data store 236 may be implemented as a portion of memory containing one or a number of various wait treatments. The memory may be volatile and/or non-volatile memory depending upon the types of wait treatments employed.

When an agent becomes available in an agent queue that is capable of servicing a contact on hold, the agent and contact selector 220 assigns the agent to the contact. Although the agent and contact selector 220 assigns the agent to the contact, the wait treatment agent 232 controls the connection of the agent to the corresponding contact. If the wait treatment agent 232 determines that it is okay to connect the agent with the contact (e.g., because the wait treatment has reached a predefined exit point), then the wait treatment agent 232 connects the agent to the contact. However, if the wait treatment agent 232 determines that it is not okay to connect the agent to the contact, then the agent assigned to the contact may be provided with customer data either from the agent and contact selector 220 or the wait treatment agent 232. The agent and contact selector 220 generally provides the assigned agent with data relating to past interactions with a customer as well as other known customer information whereas the wait treatment agent 232 provides the assigned agent with data received from the customer while they are interacting with the current wait treatment.

The types of wait treatments employed in accordance with embodiments of the present invention may be any suitable wait treatment that can be either presented to a customer from the server 110 or sent to the customer's communication device 174, 180 and executed thereon. The wait treatments may either be one-way communications from the contact center to the customer or interactive communications that can collect feedback from the customer. The wait treatment may be any presentation of information (e.g., music, entertainment, education, product and/or service information, advertising, survey, etc.) to the customer associated with the contact. In one embodiment, the communication device 174, 180 and/or a user of the device may be identified (e.g., through an email address, a customer number, an IP address, a phone number, etc.), and the wait treatment can be customized for use by the customer and/or the customer's communication device 174, 180. One example of customization of a wait treatment may include the variation of product offerings based upon a customer's type. That is a platinum level customer may be provided with a wait treatment that discusses high-end technologies for large businesses whereas a gold level customer may be provided with a wait treatment that discusses small business technologies.

Figure 3:
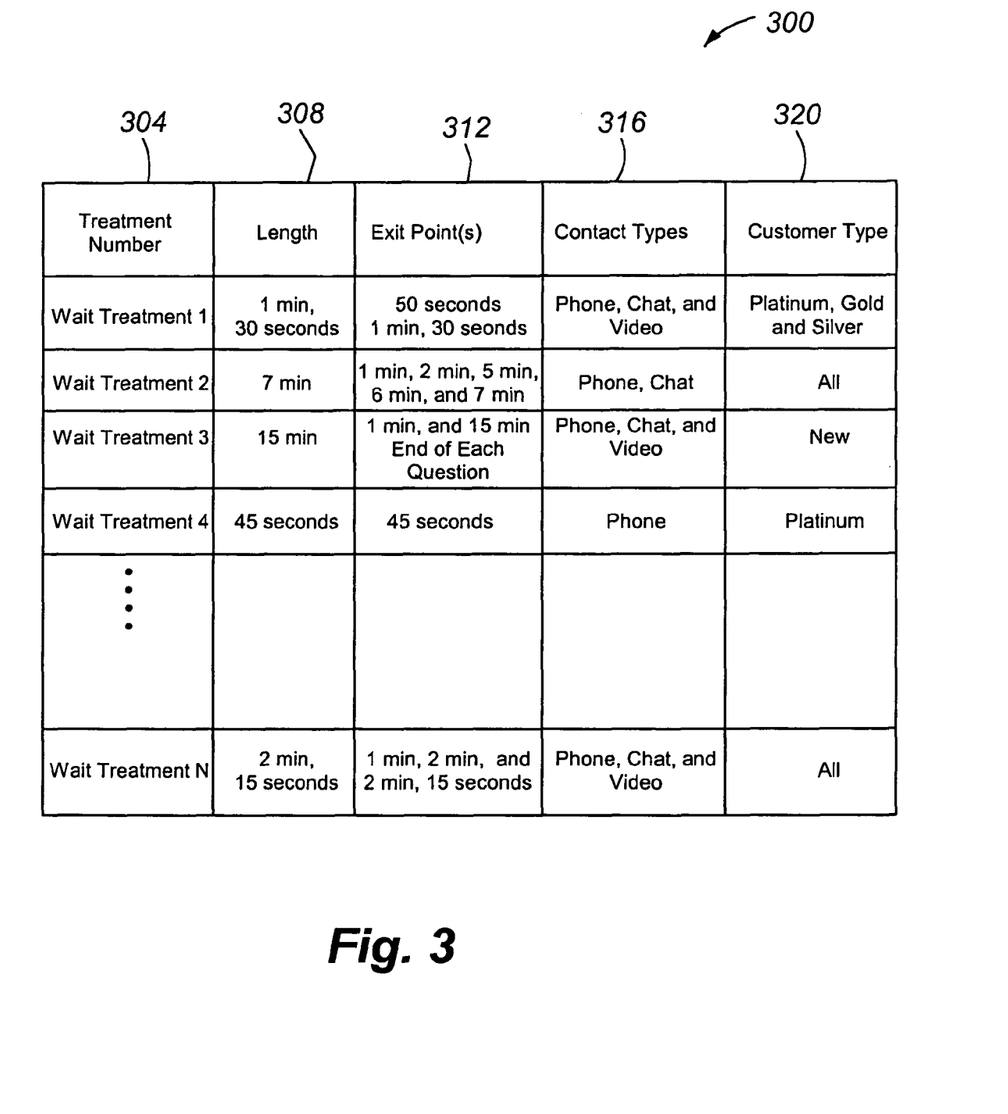
FIG. 3 is a diagram depicting a data structure employed in accordance with embodiments of the present invention.

Referring now to FIG. 3, a data structure 300 employed in accordance with embodiments of the present invention will be described. The data structure 300 may be stored in the wait treatment data store 236 resident on the server 110 or in a wait treatment database. The wait treatment agent 232 may have access to a number of different wait treatments each with a unique set of attributes, some of which are depicted in the data structure 300. The wait treatment agent 232 can choose a wait treatment from the set of wait treatments for a particular contact based upon the contact's expected wait time, customer type, contact type, and so on. Each wait treatment is associated with a unique service logic, which differs in one or more respects from the service logic of other wait treatments. For example, a wait treatment may have more, fewer, or different steps and/or customer options than the logic of other wait treatments.

In one embodiment, the data structure 300 includes a treatment number field 304 or a similar type of wait treatment identifier field. The treatment number field 304 includes an identifier for a given wait treatment. A unique number, name, or similar type of identification mechanism can be used to identify wait treatments in the treatment number field 304.

The data structure 300 may also include a length field 308 that identifies the length of a particular wait treatment. Some wait treatments may be designed for short wait times and thus may not be interactive. Other wait treatments may be designed for longer estimated wait times and those wait treatments may be interactive since an interactive wait treatment may have a better chance of keeping a customer satisfied even though they are on hold. Of course, all longer wait treatments are not necessarily interactive and some short wait treatments may be interactive.

The data structure 300 may further include an exit point identifier field 312. The exit point identifier field 312 may store information relating to the location of a particular exit point in a wait treatment. In some embodiments, a wait treatment will have an exit point at the end of the wait treatment. Thus the length of the wait treatment may correspond to at least one of the exit point's locations within the wait treatment. Many wait treatments further comprise exit points within the body of the wait treatment. In other words, exit points are interspersed within the wait treatment. For example, the second wait treatment depicted in FIG. 3 is approximately seven minutes long and has five exit points distributed throughout the length of the wait treatment. The exit points within the wait treatment may correspond to the end of a particular commercial or the end of a particular product description. The exit points are generally located within a wait treatment based on a context of the wait treatment. The exit points are located such that the customer can experience a smooth transition from the wait treatment to the agent. The context that drives the location of an exit may include, without limitation, an end of a survey, an end of a question in a survey, an end of an advertisement, a predetermined amount of time after a start of an advertisement, a predetermined amount of time after the contact enters the contact queue, and so on. The location of an exit point is typically such that the wait treatment is not interrupted during a point where the customer is being provided with important information or the customer is interacting with the wait treatment.

Another field included in the data structure 300 may include a contact type field 316. The contact type field 316 can be referenced by the wait treatment agent 232 to determine what wait treatment should be assigned to a particular contact. For example, the first wait treatment depicted is suitable for transmission to any one of a phone, chat, and video contact. Thus the first wait treatment may optionally include images or web URLs that can be presented to a customer via a web page or through video. The first wait treatment may also be perceivable through audio only and thus can be provided to a phone contact. Other wait treatments may only be suitable for one or a couple types of contacts and therefore the wait treatment agent 232 can reference the contact type field 316 prior to assigning a wait treatment to a contact.

The data structure 300 may also include a customer type field 320. The customer type field 320 may identify the types of customers a particular wait treatment is suitable for. As an example, the third wait treatment may include introductory questions designated for new customers such as, "how did you hear about us" and "what is your name." On the other hand, the fourth wait treatment may be very specific to a particular product that only platinum customers have or may have an interest in. Accordingly, the fourth wait treatment may be designated for only platinum customers in the customer type field 320.

Figure 4:
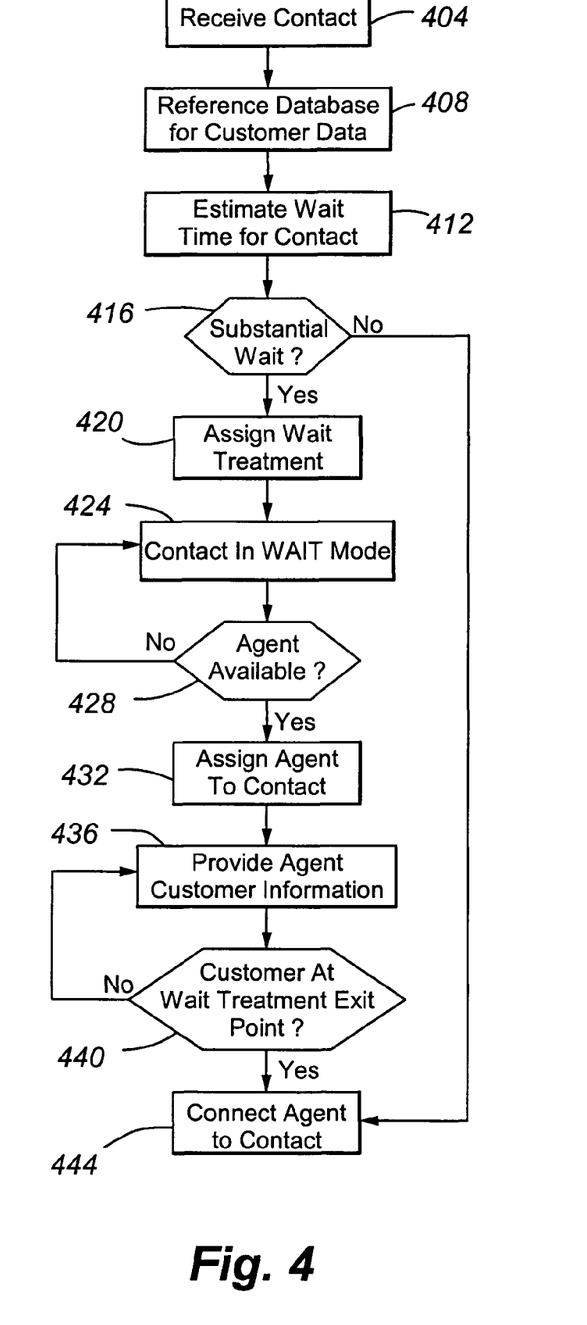
FIG. 4 is a flow chart depicting a method of handling a contact received in a contact center in accordance with embodiments of the present invention.

Referring now to FIG. 4, a method of handling a contact received in a contact center will be described in accordance with at least some embodiments of the present invention. Initially, a contact is received in a contact center (step 404). The contact can enter the contact center through the circuit switched network 154 or the packet switched network 162. After the contact has entered the contact center, the agent and contact selector 220 references the database 114 to retrieve customer data (step 408). The agent and contact selector may also analyze the state of the contact 208 and agent 212 queues to determine an estimate of wait time for the received contact (step 412). As can be appreciated, in certain embodiments, the customer data is retrieved prior to estimating the wait time for a customer because often the contact queue the received contact is assigned to will depend upon the type of customer and other customer data. However, in other embodiments, the wait time can be estimated before, or in at the same time as, customer data is pulled from the database assuming there is some customer data in the database 114.

In step 416, it is determined if the estimated wait time is substantially long (e.g., warrants placing the contact in a queue and providing the contact with a wait treatment). If the estimated wait time is substantially small (e.g., a few seconds) or an agent is already available, then the contact may be placed in a queue without being assigned a wait treatment or the contact is connected with the available agent (step 444). However, if the wait time is significant enough to justify providing the customer of the contact with a wait treatment, then the method continues and the wait treatment agent assigns the contact a wait treatment (step 420). The assigned wait treatment may be selected from a set of available wait treatments based upon the estimated wait time, customer data, and context of the wait treatment as well as other properties of the contact. The assigned wait time may also be selected based upon specific questions raised by the contact. For example, if the contact is related to help questions for a particular computer, then a wait treatment may be chosen that provides an introduction to troubleshooting such a computer.

Also, as a part of the assignment step, the selected wait treatment is provided to the customer associated with the contact via the customer's communication device 174, 180. As noted above, a wait treatment may also be assigned to a contact on hold that is not necessarily on hold but is still waiting for an agent to become available again.

While the contact is waiting, either on hold or in a queue, and is being provided with a wait treatment, the contact is considered to be in WAIT mode (step 424). The contact remains in WAIT mode at least until it is determined that an agent has become available (step 428). If it is determined that an agent is available to service the contact, then the available agent is assigned to the contact (step 432). In embodiments where the contact was on hold, the assignment of the agent to the contact may not. When the agent becomes assigned to a particular contact, the assigned agent is provided with customer information via a user interface on their communication device 134, 138 (step 436). The information provided to the assigned agent may include customer data that was retrieved from the database 114 and other data relating to previous contacts initiated by the same customer. The customer information provided to the agent may also include any information gleaned from the customer by the wait treatment. For example, if the wait treatment corresponded to a customer survey, then the assigned agent may be provided with the customer's answers to the survey questions. This allows the agent to become more familiar with the customer prior to the initiation of service of the contact.

At step 440, the wait treatment agent 232 determines if the assigned wait treatment has reached an exit point. In other words, the wait treatment agent 232 determines if it is a good time to transition the contact from the contact queue 208 where a wait treatment is being provided to the assigned agent. The wait treatment agent 232 may reference a timer associated with the wait treatment and compare the value on the timer to exit point locations in the exit point identifier field 312. Alternatively, the wait treatment may send out a signal or similar type of exit point identifier when an exit point is reached. The wait treatment agent 232 can realize that the wait treatment has reached an exit point when such a signal is received.

If the customer is in middle of a wait treatment and the position of the wait treatment does not correspond to an exit point, then the agent stays in an assigned but waiting state. During this state, the agent may be provided with more customer information that has been gleaned from the wait treatment or from other sources. By providing the contact center agent with further information relating to the customer, the agent can make efficient use of the time while waiting for the contact to reach an exit point in the wait treatment. It may be true that requiring an agent to wait for a contact could decrease contact center performance. However, if the contact center agent is making use of the waiting time by reviewing the customer's information, then the agent may be capable of servicing the contact in a more efficient manner once the agent and contact are connected. In some embodiments, part of the customer information may include preliminary or general questions that the customer has and during the wait time an assigned agent may begin finding answers to the contact questions and may also begin servicing the contact without actually being connected to the contact.

Once the contact reaches an exit point in the wait treatment the agent is connected to the contact (step 444). The connection of an agent to a contact may include establishing a communication link between the agent communication device 134, 138 and the customer communication device 174, 180. The link may be made via the server 110 and/or the switch 130 depending upon the functionality of the customer and agent's communication devices. During the connecting step, the wait treatment may be removed from the customer's communication device 174, 180 if the wait treatment was being executed thereon. In accordance with one embodiment, the wait treatment may be provided to the contact while the agent is connected to the contact. This may allow the agent to ask the customer if he/she is interested in a product or service associated with the wait treatment while the customer is receiving the wait treatment.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving a contact in a contact queue;
   assigning an agent to the contact;
   choosing a wait treatment for the contact having at least one exit point corresponding to a predetermined time;
   providing the chosen wait treatment to the contact;
   after assigning the agent to the contact one of:
      (i) waiting for the predetermined time to commence connecting the agent to the contact;
      (ii) waiting until after the predetermined time to commence connecting the agent to the contact; and
   after waiting, connecting the agent to the contact.

2. The method of claim 1, wherein the wait treatment is chosen from a set of possible wait treatments.

3. The method of claim 2, wherein the choice of a wait treatment is based on at least one of an estimated time the contact will remain in the contact queue, a type of the contact, and a type of customer associated with the contact.

4. The method of claim 1, wherein the at least one exit point is located within the wait treatment based on a context of the wait treatment.

5. The method of claim 4, wherein the context comprises at least one of an end of a survey, an end of a question in a survey, an end of an advertisement, a predetermined amount of time after a start of an advertisement, and a predetermined amount of time after the contact enters the contact queue.

6. The method of claim 1, wherein the at least one exit point comprises a first and a second exit point only one of which corresponds to an end of the wait treatment.

7. The method of claim 1, further comprising:
   determining that an agent is available to service the contact;
   identifying that the contact has reached the at least one exit point in the wait treatment;
   stopping the wait treatment; and
   removing the contact from the contact queue.

8. The method of claim 1, wherein the contact comprises at least one of a phone call, a Voice over Internet Protocol (VoIP) call, a video call, and a chat.

9. The method of claim 1, further comprising providing customer information to the agent assigned to the contact while the agent is assigned to the contact.

10. The method of claim 9, wherein the customer information is provided to the agent prior to connecting the agent to the contact.

11. The method of claim 9, wherein customer information comprises data received from a customer associated with the contact through the wait treatment.

12. A non-transitory computer readable medium comprising executable instructions for performing the steps of claim 1.

13. A system for servicing a contact received in a contact center, comprising:
   a queue for temporarily holding contacts received in a contact center until an agent becomes available to service the contact;
   at least one wait treatment selectively assignable to contacts in the queue, wherein the at least one wait treatment comprises at least one predefined exit point; and
   wherein the at least one wait treatment remains assigned to a contact in the queue until the at least one predefined exit point is reached regardless of whether an agent is available to service the contact.

14. The system of claim 13, wherein the at least one wait treatment is chosen from a set of possible wait treatments.

15. The system of claim 14, wherein the choice of a wait treatment is based on at least one of an estimated time the contact will remain in the contact queue, a type of the contact, and a type of customer associated with the contact.

16. The system of claim 13, wherein the at least one predefined exit point is located within the wait treatment based on a context of the wait treatment.

17. The system of claim 16, wherein the context comprises at least one of an end of a survey, an end of a question in a survey, an end of an advertisement, a predetermined amount of time after a start of an advertisement, and a predetermined amount of time after the contact enters the contact queue.

18. The system of claim 13, wherein the contact comprises an interactive contact.

19. The system of claim 13, wherein the contact comprises at least one of a phone call, a Voice over Internet Protocol (VoIP) call, a video call, and a chat.

20. The system of claim 13, further comprising a server capable of providing customer information to an agent assigned to the contact while the agent is assigned to the contact.

21. The system of claim 20, wherein the customer information is provided to the assigned agent prior to connecting the agent to the contact.

22. The system of claim 20, wherein customer information comprises data received from a customer associated with the contact through the wait treatment.

* * * * *